US 8,407,269 B2

United States Patent
Hayes

(10) Patent No.: US 8,407,269 B2
(45) Date of Patent: Mar. 26, 2013

(54) SYSTEM AND METHOD TO COMPUTE NARROW BOUNDS ON A MODAL INTERVAL SPHERICAL PROJECTION

(75) Inventor: Nathan T. Hayes, Minneapolis, MN (US)

(73) Assignee: Sunfish Studio, LLC, Minneapolis, MN (US)

( * ) Notice: Subject to any disclaimer, the term of this patent is extended or adjusted under 35 U.S.C. 154(b) by 1280 days.

(21) Appl. No.: 12/063,067

(22) PCT Filed: Oct. 2, 2006

(86) PCT No.: PCT/US2006/038871
§ 371 (c)(1),
(2), (4) Date: May 29, 2008

(87) PCT Pub. No.: WO2007/041653
PCT Pub. Date: Apr. 12, 2007

(65) Prior Publication Data
US 2008/0307027 A1    Dec. 11, 2008

Related U.S. Application Data

(60) Provisional application No. 60/722,107, filed on Sep. 30, 2005.

(51) Int. Cl.
*G06F 7/38* (2006.01)
(52) U.S. Cl. ........................................ 708/446; 708/200
(58) Field of Classification Search ........................ None
See application file for complete search history.

(56) References Cited

U.S. PATENT DOCUMENTS

| | | | | |
|---|---|---|---|---|
| 4,888,724 A | * | 12/1989 | Marom et al. | 708/801 |
| 2003/0172099 A1 | * | 9/2003 | Walster et al. | 708/446 |

* cited by examiner

*Primary Examiner* — Michael D Yaary
(74) *Attorney, Agent, or Firm* — Nawrocki, Rooney & Sivertson, P.A.

(57) ABSTRACT

A computer executable method of processing a representation of a modal interval spherical projection is provided. A representation of a vector comprised of modal intervals X, Y, and Z is provided wherein each modal interval of the modal intervals are delimited by first and second marks of a digital scale. An analytical expression of an azimuthal spherical projection is partitioned into terms of a pair of independent functions wherein a function of the pair exhibits a monotonicity over piecewise domains of the function. A modal interval analysis is performed upon the function wherein arguments of said piecewise domains are modal intervals.

34 Claims, 9 Drawing Sheets

$F(X, Y, Z) =$
  if $x_1 \geq 0, x_2 \geq 0, y_1 \geq 0, y_2 \geq 0$ then $[\ f(x_1, y_2, z_2),\ f(x_2, y_1, z_1)\ ]$,
  if $x_1 \geq 0, x_2 \geq 0, y_1 \geq 0, y_2 < 0$ then $[\ f(x_1, 0, z_2),\ f(x_2, mag(y_2, y_1), z_1)\ ]$,
  if $x_1 \geq 0, x_2 \geq 0, y_1 < 0, y_2 \geq 0$ then $[\ f(x_1, mag(y_1, y_2), z_2),\ f(x_2, 0, z_1)\ ]$,
  if $x_1 \geq 0, x_2 \geq 0, y_1 < 0, y_2 < 0$ then $[\ f(x_1, y_1, z_2),\ f(x_2, y_2, z_1)\ ]$,
  if $x_1 \geq 0, x_2 < 0, y_1 \geq 0, y_2 \geq 0$ then $[\ f(x_1, y_2, z_2),\ f(x_2, y_2, z_2)\ ]$,
  if $x_1 \geq 0, x_2 < 0, y_1 \geq 0, y_2 < 0$ then $[\ f(x_1, 0, z_2),\ f(x_2, 0, z_2)\ ]$,
  if $x_1 \geq 0, x_2 < 0, y_1 < 0, y_2 \geq 0$ then $[\ 0, 0\ ]$,
  if $x_1 \geq 0, x_2 < 0, y_1 < 0, y_2 < 0$ then $[\ f(x_1, y_1, z_2),\ f(x_2, y_1, z_2)\ ]$,
  if $x_1 < 0, x_2 \geq 0, y_1 \geq 0, y_2 \geq 0$ then $[\ f(x_1, y_1, z_1),\ f(x_2, y_1, z_1)\ ]$,
  if $x_1 < 0, x_2 \geq 0, y_1 \geq 0, y_2 < 0$ then $[\ 0, 0\ ]$,
  if $x_1 < 0, x_2 \geq 0, y_1 < 0, y_2 \geq 0$ then $[\ f(x_1, 0, z_1),\ f(x_2, 0, z_1)\ ]$,
  if $x_1 < 0, x_2 \geq 0, y_1 < 0, y_2 < 0$ then $[\ f(x_1, y_2, z_1),\ f(x_2, y_2, z_1)\ ]$,
  if $x_1 < 0, x_2 < 0, y_1 \geq 0, y_2 \geq 0$ then $[\ f(x_1, y_1, z_1),\ f(x_2, y_2, z_2)\ ]$,
  if $x_1 < 0, x_2 < 0, y_1 \geq 0, y_2 < 0$ then $[\ f(x_1, mag(y_2, y_1), z_1),\ f(x_2, 0, z_2)\ ]$,
  if $x_1 < 0, x_2 < 0, y_1 < 0, y_2 \geq 0$ then $[\ f(x_1, 0, z_1),\ f(x_2, mag(y_1, y_2), z_2)\ ]$,
  if $x_1 < 0, x_2 < 0, y_1 < 0, y_2 < 0$ then $[\ f(x_1, y_2, z_1),\ f(x_2, y_1, z_2)\ ]$.

FIG. 4

MASK-DRIVEN MODAL INTERVAL SPHERICAL PROJECTION

| 4 | 3 | 2 | 1 | 0 | $w_1$ | $w_2$ |
|---|---|---|---|---|---|---|
| 0 | 0 | 0 | 0 | 0 | $\downarrow f(x_1, y_2, z_2)$ | $\uparrow f(x_2, y_1, z_1)$ |
| 0 | 0 | 0 | 0 | 1 | $\downarrow f(x_1, 0, z_2)$ | $\uparrow f(x_2, mag(y_2, y_1), z_1)$ |
| 0 | 0 | 0 | 1 | 0 | $\downarrow f(x_1, mag(y_1, y_2), z_2)$ | $\uparrow f(x_2, 0, z_1)$ |
| 0 | 0 | 0 | 1 | 1 | $\downarrow f(x_1, y_1, z_2)$ | $\uparrow f(x_2, y_2, z_1)$ |
| 0 | 0 | 1 | 0 | 0 | $\downarrow f(x_1, y_2, z_2)$ | $\uparrow f(x_2, y_2, z_2)$ |
| 0 | 0 | 1 | 0 | 1 | $\downarrow f(x_1, 0, z_2)$ | $\uparrow f(x_2, 0, z_2)$ |
| 0 | 0 | 1 | 1 | 0 | 0 | 0 |
| 0 | 0 | 1 | 1 | 1 | $\downarrow f(x_1, y_1, z_2)$ | $\uparrow f(x_2, y_1, z_2)$ |
| 0 | 1 | 0 | 0 | 0 | $\downarrow f(x_1, y_1, z_1)$ | $\uparrow f(x_2, y_1, z_1)$ |
| 0 | 1 | 0 | 0 | 1 | 0 | 0 |
| 0 | 1 | 0 | 1 | 0 | $\downarrow f(x_1, 0, z_1)$ | $\uparrow f(x_2, 0, z_1)$ |
| 0 | 1 | 0 | 1 | 1 | $\downarrow f(x_1, y_2, z_1)$ | $\uparrow f(x_2, y_2, z_1)$ |
| 0 | 1 | 1 | 0 | 0 | $\downarrow f(x_1, y_1, z_1)$ | $\uparrow f(x_2, y_2, z_2)$ |
| 0 | 1 | 1 | 0 | 1 | $\downarrow f(x_1, mag(y_2, y_1), z_1)$ | $\uparrow f(x_2, 0, z_2)$ |
| 0 | 1 | 1 | 1 | 0 | $\downarrow f(x_1, 0, z_1)$ | $\uparrow f(x_2, mag(y_1, y_2), z_2)$ |
| 0 | 1 | 1 | 1 | 1 | $\downarrow f(x_1, y_2, z_1)$ | $\uparrow f(x_2, y_1, z_2)$ |
| 1 | x | x | x | x | NaN | NaN |

FIG. 8

SYSTEM AND METHOD TO COMPUTE NARROW BOUNDS ON A MODAL INTERVAL SPHERICAL PROJECTION

This is an international application filed under 35 USC §363 claiming priority under 35 U.S.C. §119(e)(1), of provisional application Ser. No. 60/722,107, having a filing date of Sep. 30, 2005 and incorporated herein by reference in its entirety.

TECHNICAL FIELD

The present invention relates to performing arithmetic operations on modal intervals within a computer, more particularly, the present invention relates to a system and method to compute narrow bounds on a modal interval spherical projection.

BACKGROUND OF THE INVENTION

Spherical Projections

A spherical projection is a mathematical function involving a projection of a point in three dimensions onto the surface of a sphere. More particularly, a canonical formulation considers projections onto a sphere of unit radius. If $\rho^2 = x^2 + y^2 + z^2$ is the radius squared of a point $p=(x,y,z)$, the analytic form of a canonical spherical projection is $$(x', y', z') = \left(\frac{x}{\rho}, \frac{y}{\rho}, \frac{z}{\rho}\right).$$

The point $p'=(x',y',z')$ lies on the surface of the unit sphere, and it is the spherical projection of p.

The present invention is also concerned with azimuthal projections, that is, projections which map a point on the surface of a sphere to a point on a plane. Orthographic projection is the simplest example, as it maps a point on the surface of a sphere, p', to a point on the z=0 plane by simply setting the value of z' equal to zero. The analytical form of an orthographic projection is $(x'',y'',z'')=(x',y',0)$. If $p'=(x',y',z')$ is a point on a unit sphere, the point $p''=(x'',y'',z'')$ lies within a unit circle on the z=0 plane.

The most classical use of azimuthal projections can be seen in the works of cartographers and mapmakers, wherein the surface of the earth is mapped onto a flat sheet of paper. The United Nations logo is an example of an azimuthal projection.

Azimuthal projections also play a key role in the physical sciences. Radiometry, for example, is a branch of physics which quantifies and measures the propagation of light across the electromagnetic spectrum. Radiance is the most important physical unit in radiometry, and it measures the amount of light arriving from many directions over a tiny area in space. A geometric interpretation of radiance is exactly equivalent to an orthographic projection of light falling onto the surface of a sphere which is centered about the tiny area of measurement.

Not surprisingly, this geometrical interpretation of radiance is the reason spherical projections are so fundamental and ubiquitous in the art of computer graphics. To computer graphics artisans, radiance is the essential quantity. The purpose of any computer graphics program is to calculate, or at least estimate, the radiance which propagates throughout a virtual three-dimensional scene and then arrives at a viewing plane of a virtual camera.

Rendering methods for computer graphics fall generally into one of two categories. The aim of any so-called global illumination method is physical accuracy. Global illumination solutions are generally associated with a high-degree of realism but also a large computational expense. Subsequently, it is the so-called local illumination methods which "cut corners" and approximate a global illumination solution for the sake of speed. In many cases, local illumination methods are fast enough for use in real-time graphics applications.

As previously mentioned, the geometric interpretation of radiance is exactly equivalent to an orthographic spherical projection. For this reason, any global illumination method can be rightly thought of as a computational engine which is designed to calculate a large number of spherical projections.

A trend that is becoming increasingly popular in modern computer graphics is the use of spherical projections, or approximations thereof, in local illumination methods to facilitate the generation of real-time reflections and shadows. The paper "View-Independent Environment Maps," Heidrich, W. and Hans-Peter Seidel, Eurographics SIGGRAPH Workshop on Graphics Hardware, 1998, pp. 39-45, describes a D local illumination method for calculating reflections by using a dual parabolic environment map to simulate a spherical projection. The paper "Shadow Mapping for Hemispherical and Omnidirectional Light Sources," Brabec, S., et. al., Computer Graphics International, 2001, describes a similar technique for shadows. The paper "Sampling-Efficient Mapping of Spherical Images," Snyder, John and Don Mitchell, Technical Report, Microsoft Research, 2001, compares the relative merit of various azimuthal projections in the context of local illumination rendering methods. All three papers are incorporated herein by reference.

The present invention is specifically concerned with the evaluation of interval spherical projections, that is, a spherical projection in which the point (x,y,z) is actually a vector comprised of modal intervals, (X,Y,Z). Without loss of generality, the azimuthal projections of interval boxes to the z=0 plane are considered.

The common and popular notion of interval arithmetic is based on the fundamental premise that intervals are sets of numbers and that arithmetic operations can be performed on these sets. Such interpretation of interval arithmetic was initially advanced by Ramon Moore in 1957, and has been recently promoted and developed by interval researchers such as Eldon Hansen, William Walster, Guy Steele and Luc Jaulin. This is the so-called "classical" interval arithmetic, and it is purely set-theoretical in nature.

A set-theoretical interval is a compact set of real numbers [a,b] such that $a \leq b$. The classical interval arithmetic operations of addition, subtraction, multiplication and division combine two interval operands to produce an interval result such that every arithmetical combination of numbers belonging to the operands is contained in the interval result. This leads to programming formulas made famous by classical interval analysis, and which are discussed at length in the interval literature.

The application of interval arithmetic to the efficient evaluation of polynomial functions is not straightforward. In fact, it is fraught with many difficult problems and challenges.

Interval dependence is a phenomenon that occurs when an interval variable appears more than once in a mathematical expression. As is well-known by the interval community, interval dependence in a mathematical expression creates a pessimistic result, that is, the result contains excessive interval width. Even worse, pessimism caused by multiple occurrences of an interval variable in an expression is cumulative, that is, pessimism grows as the number of instances of an interval variable in an expression increases.

For an interval spherical projection, dependence is a source of dramatic pessimism. This is due to the multiple instances of function variables in the analytical expression of the spherical projection. The result is a large amount of pessimism in the final computation.

The motivation for an interval spherical projection is to facilitate new developments in interval computer graphics. For example, in Applicant's publication WO 2004/046881 entitled VISIBLE SURFACE DETERMINATION SYSTEM & METHODOLOGY IN COMPUTER GRAPHICS USING INTERVAL ANALYSIS, now U.S. Pat. No. 7,250,948 B2, which is incorporated herein by reference, a system and method for interval computer graphics is provided. The use of interval spherical projections in such a system facilitates solutions to complex global illumination and local illumination problems as discussed in the previous section.

Heretofore, publications directed to interval spherical projections appear absent. The paper "Interval Angles and the Fortran ATAN2 Intrinsic Function," Technical Report, Sun Microsystems, 2002, which is incorporated herein by reference, is perhaps the only teaching that comes close to addressing the subject, however, said paper does not consider the unique problems posed by an interval spherical projection function.

Modal Intervals

In 2001, Miguel Sainz and other members of the SIGLA/X group at the University of Girona, Spain, introduced a new branch of interval mathematics known as "modal intervals." Unlike the classical view of an interval as a compact set of real numbers, the new modal mathematics considers an interval to be a quantified set of real numbers.

As a practical consequence, a modal interval is comprised of a binary quantifier and a set-theoretical interval. In the modal interval literature, an apostrophe is used to distinguish a set-theoretical interval from a modal interval, so if Q is a quantifier and X' is a purely set-theoretical interval, then X=(Q, X') is a modal interval. For this reason, it is easy to see that modal intervals are a true superset of the classical set-theoretical intervals. At the same time, the quantified nature of a modal interval provides an extra dimension of symmetry not present in the classical set-theoretical framework.

This difference allows the modal intervals to solve problems out of the reach of their classical counterparts. Just as the real expression 3+x=0 has no meaning without negative numbers, it can be shown that the interval expression [1,2]+X=[0, 0] has no meaning without quantified (i.e., modal) intervals.

The quantified nature of a modal interval comes from predicate logic, and the value of a quantifier may be one of the fundamental constructions $\exists$ or $\forall$, that is, "existential" or "universal." The symbols $\exists$ or $\forall$ are commonly read or interpreted as "there exists" and "for all," respectively.

The article "Modal Intervals," M. Sainz, et. al., Reliable Computing, Vol. 7.2, 2001, pp. 77-111, provides an in-depth introduction to the notion of modal intervals, how they differ from the classical set-theoretical intervals, and upon what mathematical framework they operate; the article is also incorporated herein by reference.

In light of the shortcomings of heretofore known numerical methods, techniques and approaches generally, and the aforementioned inherent challenges with spherical projections, there remains an unmet need for novel computational systems and methods. More particularly, with the work of Sainz et al. as a backdrop, it remains particularly advantageous to provide a computational system and method for a spherical projection wherin the point to be projected is actually a modal interval vector.

SUMMARY OF THE INVENTION

The present invention advantageously provides a novel computational system and method for a modal interval spherical projection, that is, a projection in which the point to be projected, (x,y,z), is actually a modal interval vector, (X,Y, Z). The preferred embodiment of the present invention includes an Azimuthal Projection Unit (APU).

The APU, which is a hardware circuit for processing a representation of a modal interval spherical projection, works in conjunction with a floating-point processor. During the computational process, the APU uses the floating-point processor to calculate the correctly-rounded endpoints of a modal interval result.

The present invention advantageously uses a representation of modal intervals within a computer as described in applicant's copending international application ser. no. PCT/US06/38579 filed Oct. 2, 2006 entitled REPRESENTATION OF MODAL INTERVALS WITHIN A COMPUTER, incorporated herein by reference. The APU receives a representation of a vector comprised of modal intervals X, Y and Z. It then performs an azimuthal spherical projection on the vector and returns a new vector of modal intervals as a result.

To perform the projection, the present invention examines the bit-pattern of each of the six numbers which comprise the endpoints of X, Y and Z. For each bit-pattern of each number, a corresponding S (sign), N (not-a-number), and Z (zero) flag is set to a state which characterizes the number.

Once each bit-pattern is examined, the signal of each S, N and Z flag of each number is used to construct a 5-bit mask such that four consecutive bits in the mask represent an ordered arrangement of the signs of the numbers of the endpoints of X and Y, and a fifth bit in the mask represents the presence or absence of an indefinite operand or a condition that $Z \geqq 0$ is not true.

The 5-bit mask is then used to transfer control of the APU to one of several different cases. Sixteen permutations of the mask represent the unexceptional cases of an azimuthal spherical projection, and all remaining permutations of the mask represent an indefinite result.

By combination of these parts and methods, the APU is capable of computing narrow bounds on an azimuthal spherical projection. The present invention is suitable for use in any calculation involving modal interval projections of the sphere, particularly as in the calculation of global illumination solutions for computer graphics or the generation of real-time shadows and reflections in a modal interval computer graphics rendering application.

In another embodiment of the present invention, special software instruction is provided to a floating-point processor, thereby emulating the aforementioned function of the APU on a general-purpose computational device.

BRIEF DESCRIPTION OF THE DRAWINGS

FIG. 4 represents a formula to evaluate a modal interval spherical projection over a collection of piecewise domains;

FIG. 8 presents tabulated conditions for a mask-driven modal interval spherical projection; and, FIG. 9 depicts logic operations in furtherance of computing results of a modal interval spherical projection.

DETAILED DESCRIPTION OF THE INVENTION

Geometrical Interpretation

A spherical projection is a mathematical function involving a projection of a point in three dimensions onto the surface of a sphere. More particularly, a canonical formulation considers projections onto a sphere of unit radius. If $\rho^2 = x^2 + y^2 + z^2$ is the radius squared of a point $p=(x,y,z)$, the analytic form of a canonical spherical projection is $$(x', y', z') = \left(\frac{x}{\rho}, \frac{y}{\rho}, \frac{z}{\rho}\right).$$

The point $p'=(x',y',z')$ lies on the surface of the unit sphere, and it is the spherical projection of p.

The present invention is also concerned with azimuthal projections, that is, projections which map a point on the surface of a sphere to a point on a plane. Without loss of generality, only azimuthal projections which map a unit sphere to the z=0 plane are considered. It should be obvious that other azimuthal projections are equivalent and can be easily reformulated into this canonical setting by using methods that are well known in the art.

Figure 1:
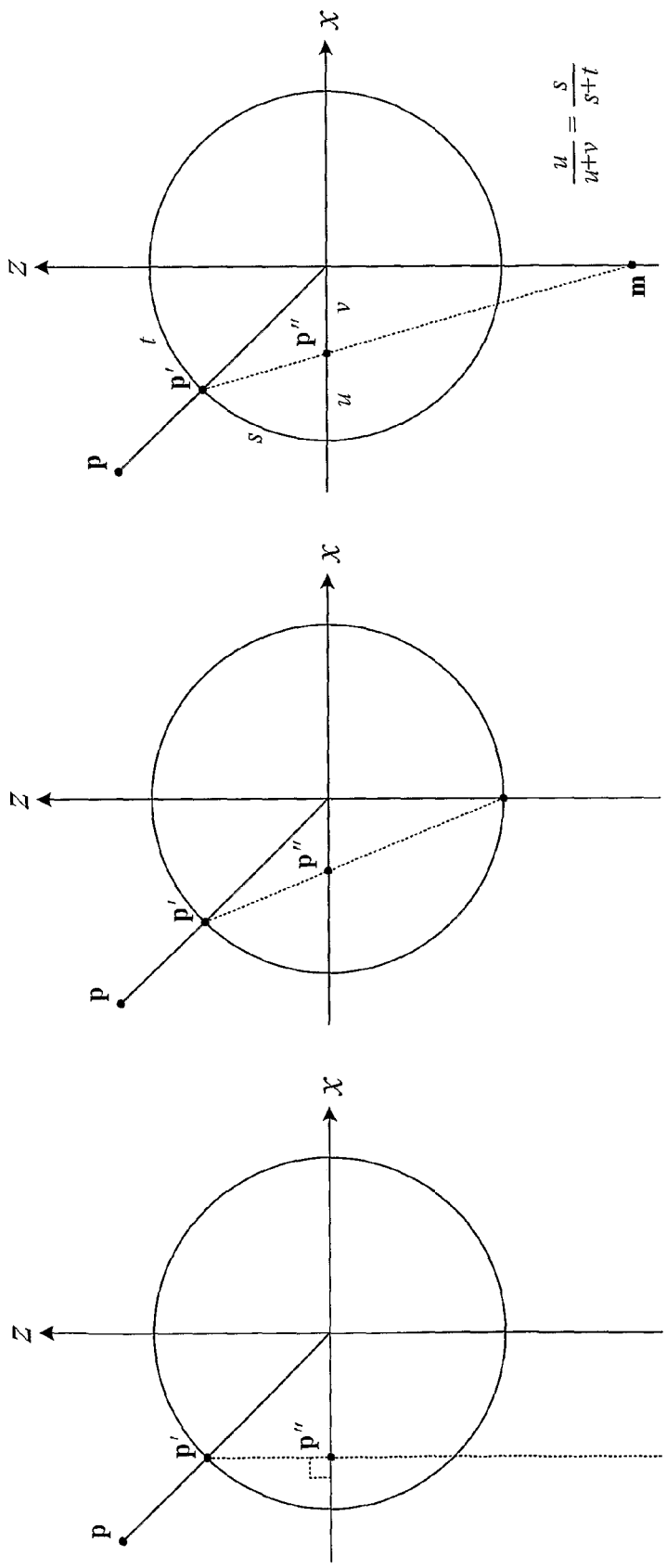
FIGS. 1 (A)-(C) represent geometric interpretations of classical azimuthal spherical projections.

FIGS. 1(A)-(C) depict geometrical interpretations of classical azimuthal projections, which map a point, p', on the surface of a unit sphere to a point, p", on the z=0 plane.

FIG. 1(A) is a geometric interpretation of an orthographic projection. A line parallel to the z-axis and passing through p' intersects the z=0 plane at p".

FIG. 1(B) is a geometric interpretation of a stereographic projection. A line connecting p' to the pole on the negative z-axis intersects the z=0 plane at p".

FIG. 1(C) is a geometric interpretation of an equidistant projection. A line connecting p' to a point, m, on the negative z-axis intersects the z=0 plane at p". Line segments u and v are related to arcs s and t by the equivalence of ratios $u/(u+v)=s/(s+t)$, which is always true for any p' and a constant m.

An observation to be made is that, for orthographic projection, any two points on a sphere with coordinates of equal x' and y' but complimentary z' project to the same location within a unit circle on the z=0 plane. For stereographic and equidistant projections, any p' with z'>0 projects to a location inside the unit circle whereas any p' with z'<0 projects to a possibly infinite location outside the unit circle. Because most practical applications are concerned with projections that have a mathematical inverse, it is common practice to consider only a projection of the positive hemisphere, that is, the set of p' with $z' \geqq 0$. In this case, complimentary projections of the negative hemisphere are easily achieved by reflection of the z-axis.

Figure 2:
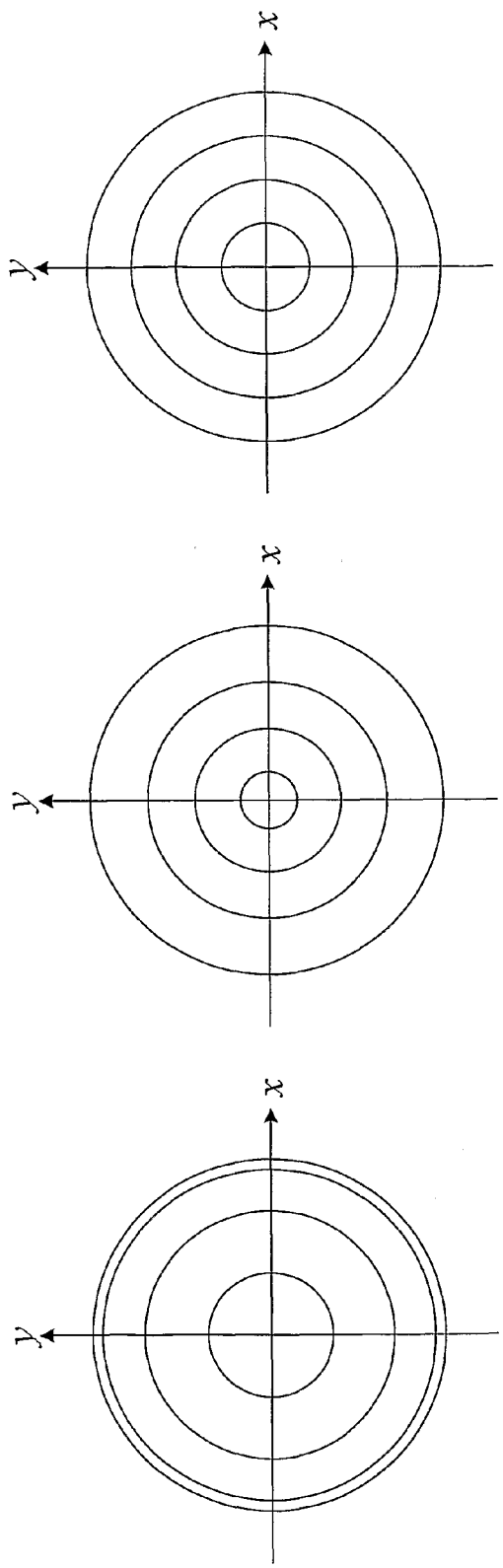
FIGS. 2 (A)-(C) represent geometric interpretations of distortion caused by each of the classical projections depicted in FIG. 1.

In the depictions of FIG. 2, lines of constant latitude of the $z' \geqq 0$ hemisphere are projected onto the z=0 plane as concentric circles. On the surface of the sphere, lines of constant latitude are perpendicular to the z-axis and equally-spaced in degrees from the equator to the poles.

Orthographic projection, depicted in FIG. 2(A), causes severe distortion of distances near the equator, as a large variation in spacing between concentric circles shows. Almost no distortion occurs in degrees of latitude near the pole.

Stereographic projection, depicted in FIG. 2(B), exhibits less distortion of distances over the degrees of latitude, as can be seen by a more consistent spacing between concentric circles.

Equidistant projection, depicted in FIG. 2(C), has the special property that no distortion in the spacing between concentric circles occurs. In this case, the projection along radial lines is optimal, as constant spacing between degrees of latitude is preserved in the projection by equally-spaced concentric circles.

Analytical Formulation

The classical azimuthal projections are geometrically significant, but they are, in fact, special cases of a more general formulation.

Figure 3:
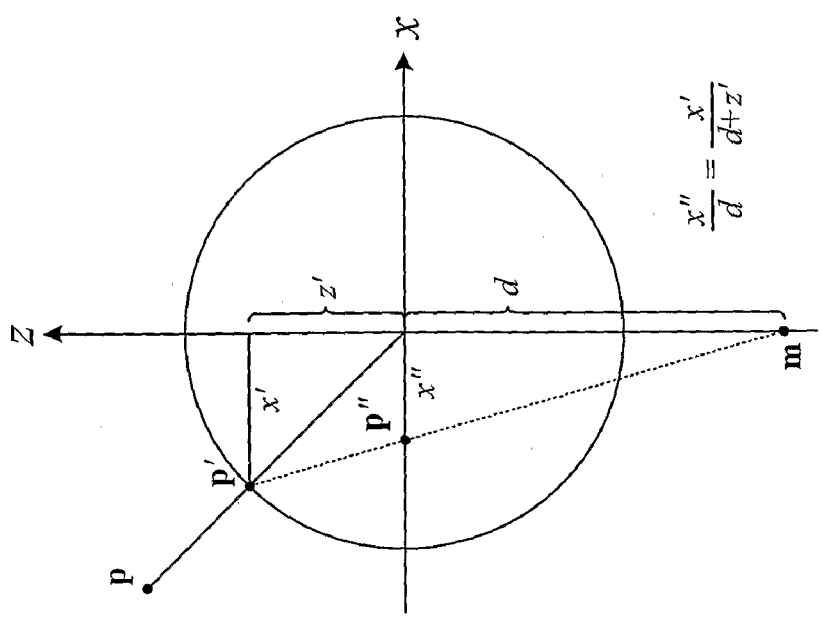
FIG. 3 depicts a geometric interpretation of a generalized azimuthal spherical projection.

FIG. 3 is a geometric interpretation of a generalized azimuthal projection. A line connecting $p'=(x',y',z')$ to a point, m, on the negative z-axis intersects the z=0 plane at $p''=(x'',y'',z'')$. The distance, d, from m to the origin determines the properties of the projection.

The table in FIG. 3 shows that orthographic, stereographic and equidistant projections are just special cases of the generalized azimuthal projection at certain values of d. A particularly noteworthy observation is that orthographic projection occurs when m is infinitely far from the origin and so all lines connecting p' and m are parallel to the z-axis.

An analytical expression is derived from the geometric interpretation of the generalized azimuthal projection. By similar triangles, $x''/d = x'/(d+z')$ and $y''/d = y'/(d+z')$. These ratios are used to derive the analytical expression of the generalized azimuthal projection of p', which is $$(x'', y'', z'') = \left(\frac{x'}{1+\frac{z'}{d}}, \frac{y'}{1+\frac{z'}{d}}, 0\right).$$

Furthermore, it is possible to combine the spherical projection of p and the generalized azimuthal projection of p' into a single analytical expression. By substitution, and by setting $\delta = 1/d$ the combined formula is $$(x'', y'', z'') = \left(\frac{\frac{x}{\rho}}{1+\delta \cdot \frac{z}{\rho}}, \frac{\frac{y}{\rho}}{1+\delta \cdot \frac{z}{\rho}}, 0\right).$$

Simplified, this is equal to $$(x'', y'', z'') = \left(\frac{x}{\rho + \delta \cdot z}, \frac{y}{\rho + \delta \cdot z}, 0\right).$$

This, at last, is an analytical expression to compute a generalized azimuthal spherical projection. It is the foundation upon which the present invention is built.

Modal Interval Analysis

The present invention is specifically concerned with a modal interval spherical projection, that is, a projection in which the point to be projected is actually a vector comprised of modal intervals. As such, and to begin, an analytical expression of a generalized azimuthal spherical projection as developed in the previous section is partitioned into terms of independent functions f and g, namely $$(x'',y'',z'')=(f(x,y,z),g(x,y,z),0)$$

The full expansion of f is $$f(x, y, z) = \frac{x}{\sqrt{x^2 + y^2 + z^2 + \delta \cdot z}},$$

and the full expansion of g is $$g(x, y, z) = \frac{y}{\sqrt{x^2 + y^2 + z^2 + \delta \cdot z}}.$$

An important observation to be made is that f and g are almost identical. In fact, it is the case that f(y,x,z)=g(x,y,z). In other words, g can be evaluated in terms of f by exchanging the x and y arguments of f. For this reason, only a computational program for f is required.

Next, an unfortunate observation to be made is that the variables x and z occur in the analytical expression of f more than once. As is well known in the interval community, interval dependence occurs as a result of such conditions. A naïve computational program which simply replaces each variable in the analytical expression with an interval counterpart and then performs the respective interval arithmetic operations will in this case yield terrible results. Interval dependence between the multi-incident variables will cause pessimism to enter into the computation, and the result will be devastating.

Because f is already in its simplest form, further algebraic manipulations of the analytic expression cannot be used to eliminate the multiple instances of x and z. According to the modal interval theorem of "coercion to optimality," it is a proof that there is no computational program comprised of simple modal interval arithmetic operations which can compute bounds on the modal interval result without introducing pessimism into the final answer.

In order to compute narrow bounds on f, a different approach is clearly needed. The last approach, then, is to examine the monotonicity of f to see if it is possible to find optimal computational programs over piecewise domains of x, y and z. To accomplish this goal, the partial derivatives of f are examined:

$$\frac{\partial f}{\partial x}(x, y, z) = \frac{\rho \cdot \delta \cdot z + y^2 + z^2}{\rho \cdot (\rho + \delta \cdot z)^2}$$

$$\frac{\partial f}{\partial y}(x, y, z) = \frac{-x \cdot y}{\rho \cdot (\rho + \delta \cdot z)^2}$$

$$\frac{\partial f}{\partial z}(x, y, z) = \frac{-x \cdot (\rho \cdot \delta + z)}{\rho \cdot (\rho + \delta \cdot z)^2}$$

Examining the partial derivatives of f is helpful and revealing, as the following conclusions are reached:
1. The sign of ∂f/∂x is always positive.
2. The sign of ∂f/∂y depends only on −x·y.
3. For all z≧0, the sign of ∂f/∂z depends only on ·x.
4. For all x and z, the saddle point of ∂f/∂y occurs at y=0.

This is all very fortunate, as it proves monotonicity over piecewise domains of f exist. Even more fortunate, the number of piecewise domains is small. If the constraint z≧0 is true, only four piecewise domains delimited by the sign of −x·y need to be considered.

Having proved monotonicity over a small number of piecewise domains, the next step is to derive the formulas for evaluating f when the arguments over these domains are modal intervals. Such a formula is F, which is given in FIG. 4. For the modal intervals X=[$x_1$,$x_2$], Y=[$y_1$,$y_2$] and Z=[$z_1$,$z_2$], with Z≧0, F computes narrow bounds on f by choosing the optimal endpoints from the modal interval arguments to evaluate f over a particular piecewise domain. The mag(a, b) function, which is used by F, returns the operand a or b, whichever has the largest magnitude. This modal interval analysis of f is novel, and it is a blueprint from which a practical computational system and method, described next, is constructed.

Azimuthal Projection Unit

The preferred embodiment of the present invention is an Azimuthal Projection Unit (APU). The APU is a hardware circuit for processing a representation of a generalized modal interval azimuthal spherical projection.

The APU uses a representation for modal intervals within a computer as described in applicant's application entitled REPRESENTATION OF MODAL INTERVALS WITHIN A COMPUTER, with the present invention using the term "mark" as defined therein.

Figure 5:
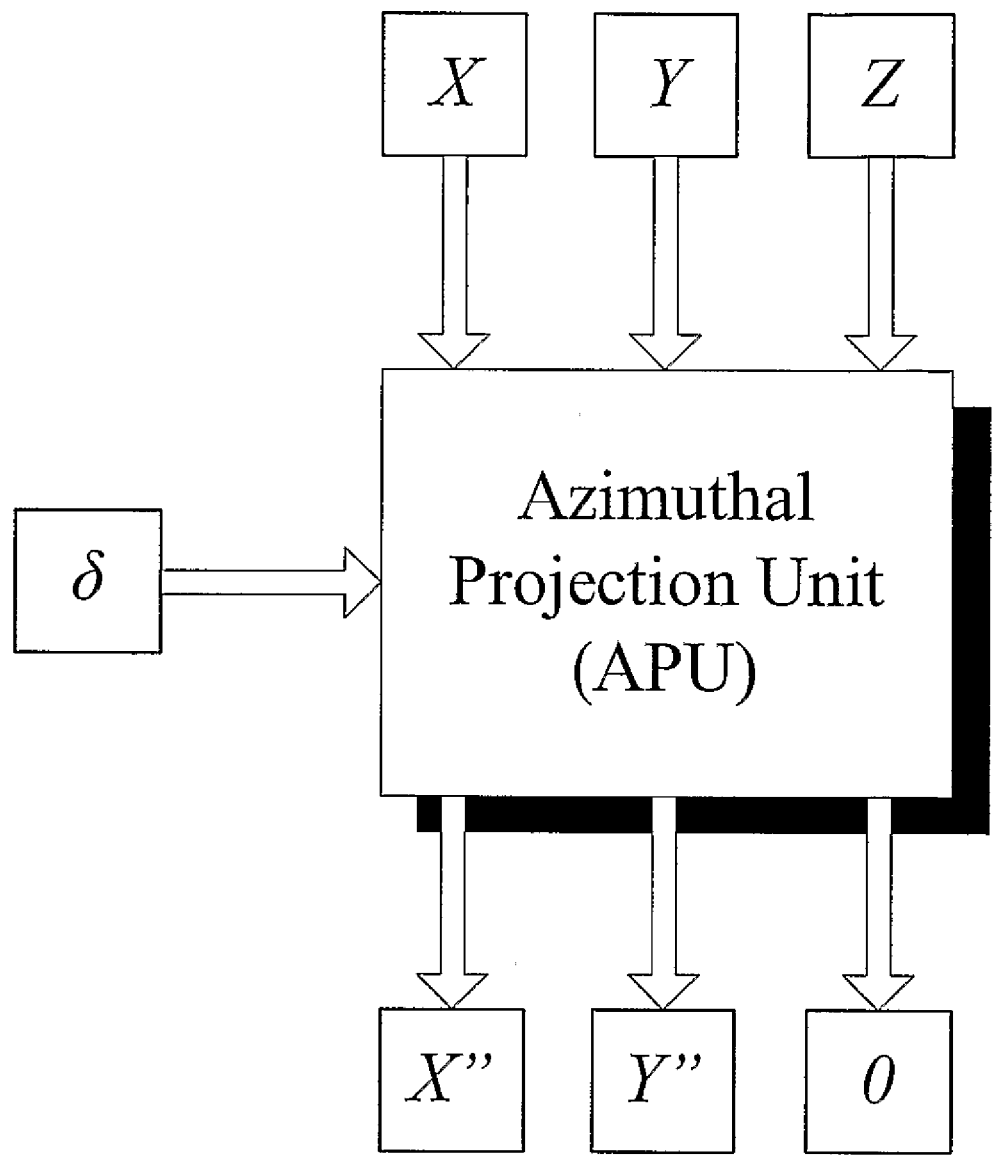
FIG. 5 represents a block diagram of the Azimuthal Projection Unit (APU) of the present invention.

FIG. 5 is a block diagram of the APU. It receives a representation of a scalar constant, δ, and a vector comprised of modal intervals X, Y and Z. The APU then performs an azimuthal spherical projection on the operands and returns a new vector comprised of modal intervals X", Y" and 0, respectively.

Classifying Numbers

To perform the projection, the present invention examines the bit-pattern of each of a first and a second mark which represent the X, Y and Z modal interval operands, respectively. For each bit-pattern of each mark, a corresponding set of status flags are set to a state which characterizes the mark. The set of status flags is comprised of an S (sign), N (not-a-number), I (infinity), and Z (zero) flag.

In the preferred embodiment of the invention, the allocation of bits which represent a mark is specified by IEEE standard 754. Specifically, the bits are grouped into three fields: sign, exponent, and fraction. It is always the case that the sign field is comprised of a single bit. The exponent field is typically comprised of 8 or 11 bits, the fraction field being respectively comprised of 23 or 52 bits. Other allocations of bits are possible, and it should be obvious that the present invention extends to such cases.

IEEE standard 754 specifies that the magnitude of a mark is infinity if the exponent field is comprised of all ones and the fraction field is comprised of all zeros. Similarly, such a mark is NaN if the exponent field is comprised of all ones and the fraction field is comprised of any combination of ones and zeros such that all bits are not zero.

Figure 6:
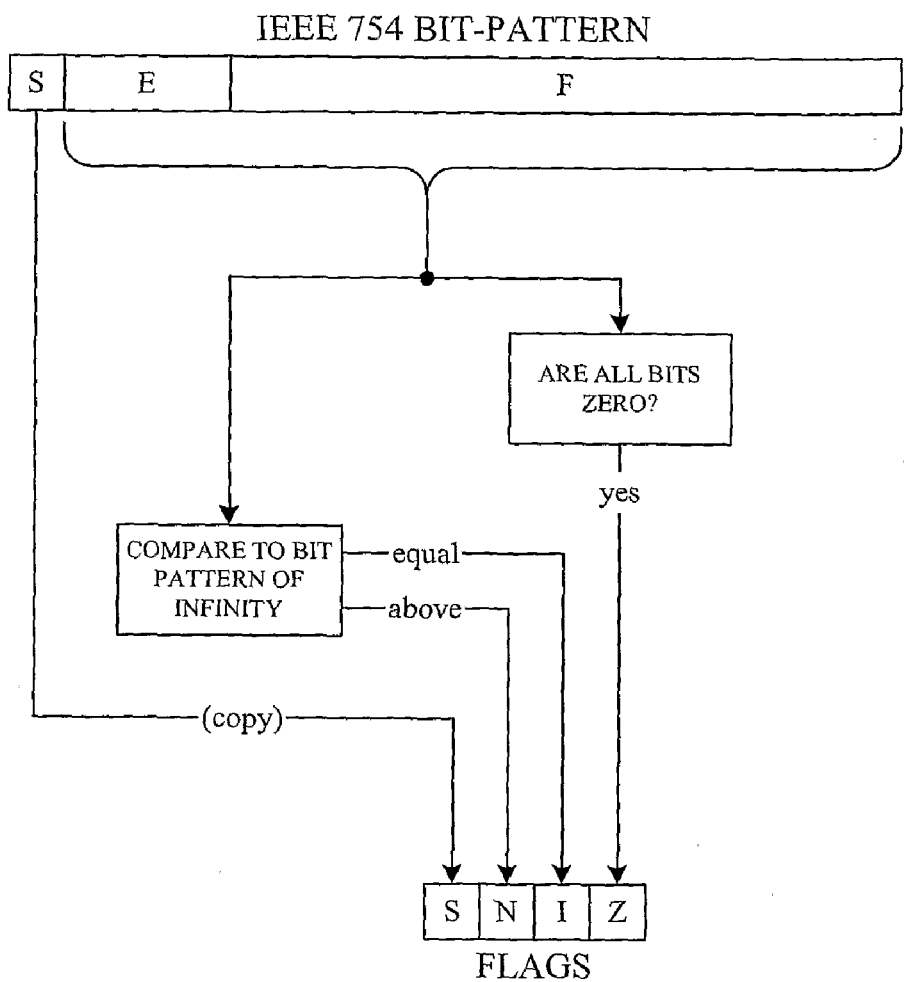
FIG. 6 represents a procedure to compute a set of status flags which characterize a floating-point number.

FIG. 6 outlines a procedure to set the state of the status flags. First, the sign bit (S) of the mark is copied to the S flag. Next, the exponent (E) and fraction (F) fields of the mark are considered as a single unsigned integer, as a logical unit; the exponent field represents the highest-order bits of the unit. The Z flag is set to 1 (true) if all bits of the unit are zero; otherwise the Z flag is set to 0 (false). The I flag is set to 1 (true) if all bits of the unit are equal to the bit-pattern of infinity; otherwise the I flag is set to 0 (false). The N flag is set to 1 (true) if the magnitude of all bits in the unit are above (greater-than) the bit-pattern of infinity; otherwise the N flag is set to 0 (false).

Creating a Mask

Figure 7:
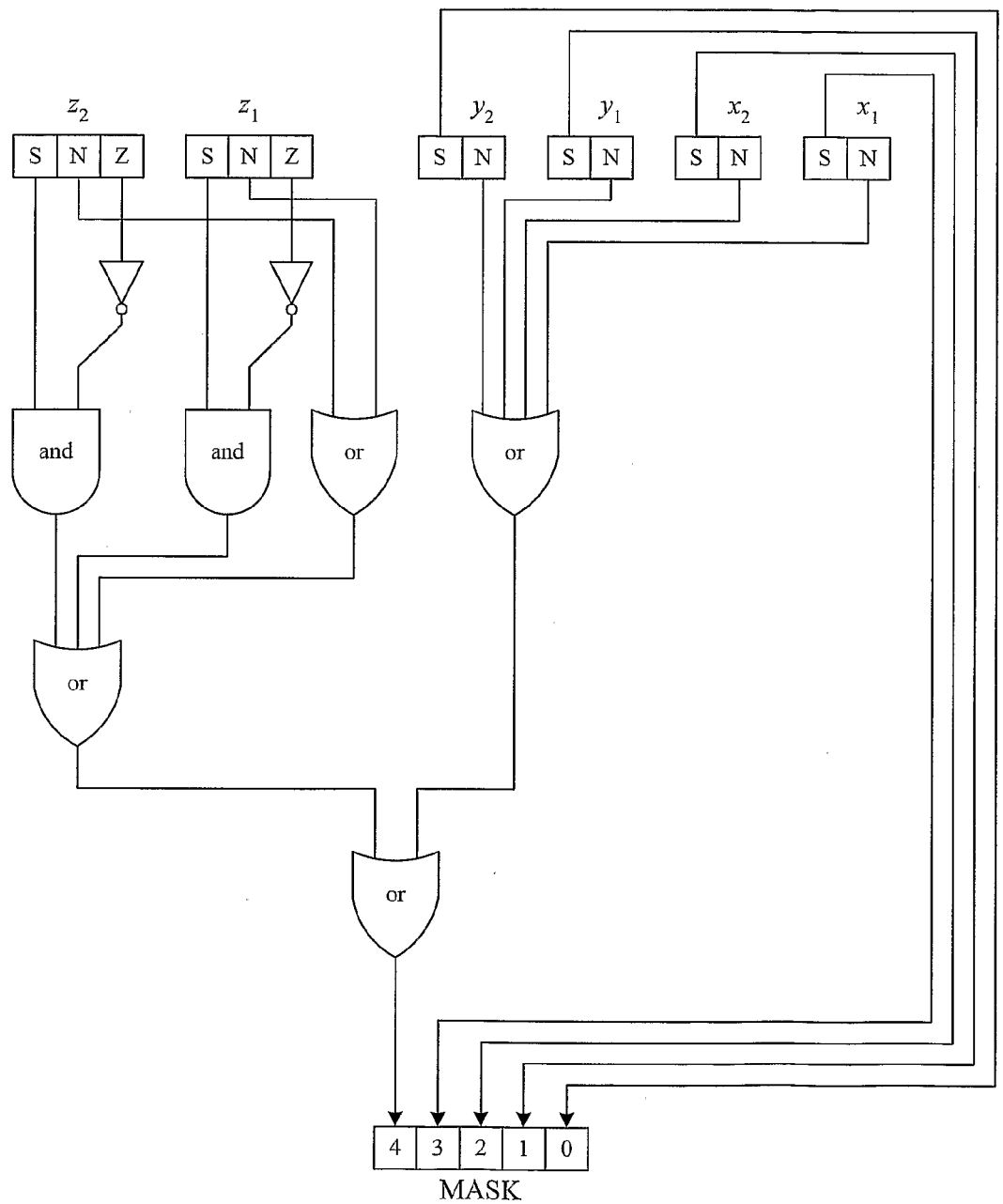
FIG. 7 depicts logic operations in furtherance of computing a 5-bit mask for a modal interval spherical projection.

The APU receives as operands a representation of modal intervals X, Y and Z. Operand X is comprised of a first mark $x_1$ and a second mark $x_2$, operand Y is comprised of a first mark $y_1$ and a second mark $y_2$, and operand Z is comprised of a first mark $z_1$ and a second mark $z_2$. Having first computed a proper state for an S, N, I and Z status flag for each of the $x_1$, $x_2$, $y_1$, $y_2$, $z_1$ and $z_2$ marks, the APU passes the signals of these states through a series of logic gates to compute a 5-bit mask, as depicted in FIG. 7.

The S flag of each $x_1$, $X_2$, $y_1$ and $y_2$ is copied into a consecutive and ordered arrangement within the mask to bit positions 3, 2, 1 and 0, respectively.

The N flag of each $x_1$, $x_2$, $y_1$ and $y_2$ pass through a four-way OR gate to produce a first intermediate result. The Z flag of $z_1$ passes through a NOT gate to produce a second intermediate result. The S flag of $z_1$ and the signal of the second intermediate result pass through an AND gate to produce a third intermediate result. The Z flag of $Z_2$ passes through a NOT gate to produce a fourth intermediate result. The S flag of $z_2$ and the signal of the fourth intermediate result pass through an AND gate to produce a fifth intermediate result. The N flags of $z_1$ and $z_2$ pass through an OR gate to produce a sixth intermediate result. The signals of the third, fifth and sixth intermediate results pass through a three-way OR gate to produce a seventh intermediate result. The signals of the first and seventh intermediate results pass through an OR gate to produce a final result within the mask at bit position 4.

By combination of these parts and methods, the present invention creates a 5-bit mask such that bits 0 to 3 represent an ordered arrangement of the signs of the marks $x_1$, $x_2$, $y_1$ and $y_2$, and that bit 4 represents the presence (1) or absence (0) of an indefinite operand or a condition that $Z \geqq 0$ is not true (1) or not false (0). In accordance with applicant's application entitled REPRESENTATION OF MODAL INTERVALS WITHIN A COMPUTER, the logic depicted in FIG. 7 to detect a condition of $Z \geqq 0$ properly considers the treatment of marks which are signed zeros.

Unexceptional Computation

If bit 4 is equal to zero (0), an unexceptional computation occurs; and the ordered arrangement of bits 0 to 3 forms a binary representation of a number representing one of a sixteen cases of F, that is, a modal interval spherical projection operation. For each case, a modal interval result comprised of a first and a second mark is defined. In all cases, if an arithmetic operation is performed to compute the first mark, the exact result of the arithmetic operation is rounded towards negative infinity; if an arithmetic operation is performed to compute a second mark, the exact result of the arithmetic operation is rounded towards positive infinity.

FIG. 8 is a table for the sixteen cases of unexceptional computation. The symbols "$\downarrow$" and "$\uparrow$" represent a rounding of an exact arithmetical result to the nearest mark towards negative and positive infinity, respectively.

For case 0, the first mark is the result of $\downarrow f(x_1, y_2, z_2)$ and the second mark is the result of $\uparrow f(x_2, y_1, z_1)$.

For case 1, the first mark is the result of $\downarrow f(x_1, 0, z_2)$ and the second mark is the result of $\uparrow f(x_2, mag(y_2, y_1), z_1)$.

For case 2, the first mark is the result of $\downarrow f(x_1, mag(y_1, y_2), z_2)$ and the second mark is the result of $\uparrow f(x_2, 0, z_1)$.

For case 3, the first mark is the result of $\downarrow f(x_1, y_1, z_2)$ and the second mark is the result of $\uparrow f(x_2, y_2, z_1)$.

For case 4, the first mark is the result of $\downarrow f(x_1, y_2, z_2)$ and the second mark is the result of $\uparrow f(x_2, y_2, z_2)$.

For case 5, the first mark is the result of $\downarrow f(x_1, 0, z_2)$ and the second mark is the result of $\uparrow f(x_2, 0, z_2)$.

For case 7, the first mark is the result of $\downarrow f(x_1, y_1, z_2)$ and the second mark is the result of $\uparrow f(x_2, y_1, z_2)$.

For case 8, the first mark is the result of $\downarrow f(x_1, y_1, z_1)$ and the second mark is the result of $\uparrow f(x_2, y_1, z_1)$.

For case 10, the first mark is the result of $\downarrow f(x_1, 0, z_1)$ and the second mark is the result of $\uparrow f(x_2, 0, z_1)$.

For case 11, the first mark is the result of $\downarrow f(x_1, y_2, z_1)$ and the second mark is the result of $\uparrow f(x_2, y_2, z_1)$.

For case 12, the first mark is the result of $\downarrow f(x_1, y_1, z_1)$ and the second mark is the result of $\uparrow f(x_2, y_2, z_2)$.

For case 13, the first mark is the result of $\downarrow f(x_1, mag(y_2, y_1), z_1)$ and the second mark is the result Of $\uparrow f(x_2, 0, z_2)$.

For case 14, the first mark is the result of $\downarrow f(x_1, 0, z_1)$ and the second mark is the result of $\uparrow f(x_2, mag(y_1, y_2), z_2)$.

For case 15, the first mark is the result of $\downarrow f(x_1, y_2, z_1)$ and the second mark is the result of $\uparrow f(x_2, y_1, z_2)$.

For cases 6 and 9, the first and second marks are both zero.

Indefinite Computation

If bit 4 is equal to one (1), an indefinite operand exists or the condition $Z \geqq 0$ is not true. A modal interval comprised of a first and a second NaN is always the result.

Complimentary Computations

The APU receives a representation of a scalar constant, $\delta$, and a vector comprised of modal intervals X, Y and Z. The APU then performs an azimuthal spherical projection on the operands and returns a new vector comprised of modal intervals X", Y" and 0, respectively.

Figure 9:
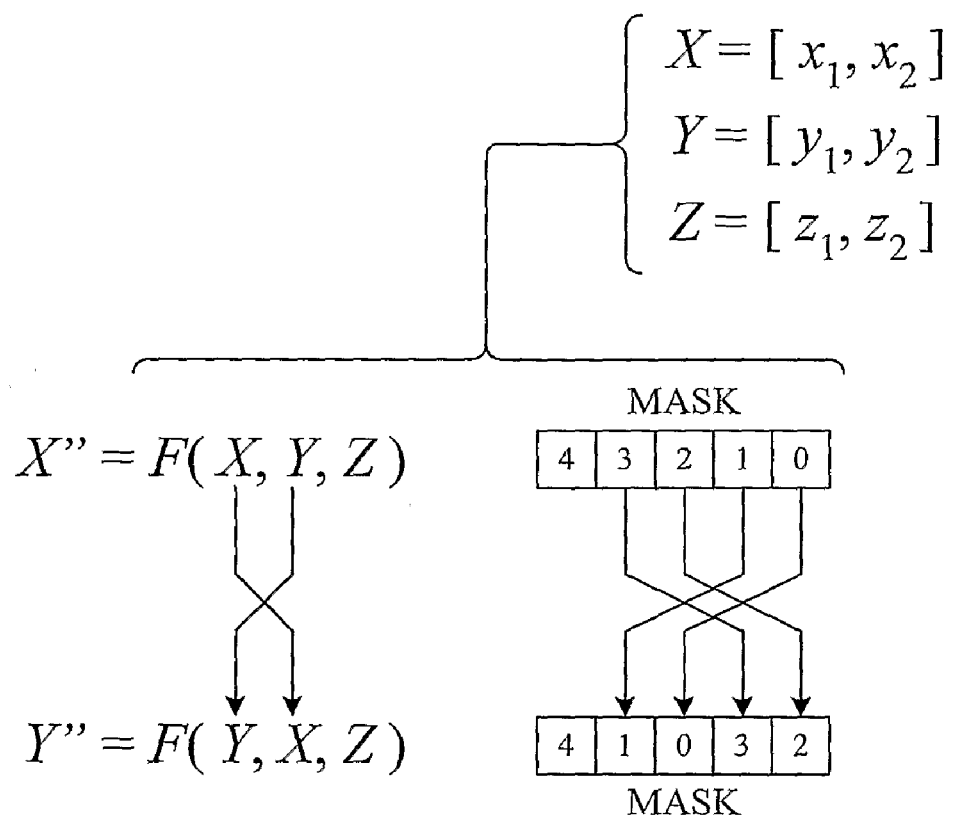

FIG. 9 shows how the APU computes X" and Y". The APU first creates a 5-bit mask from the modal interval operands X, Y and Z, and then the mask is used to compute X"=F(X, Y, Z). Then bits 0 and 2 of the mask are exchanged, as are bits 1 and 3. The result for Y" is then computed in terms of F by exchanging the X and Y operands, that is, the modified mask is used to compute Y"=F (Y, X, Z).

Conclusion

In any event that the denominator of f is zero, the spherical projection is indefinite. In this case, bit 4 of the mask can be set to one (1) to possibly avoid unnecessary complimentary computations.

Additionally, the signal of bit 4 can be made available for testing to a user as a "sticky" bit, thereby providing a simple and reliable method to for a user to detect indefinite results.

The present invention can also be used to compute sines and cosines of a two-dimensional circular projection. In this case, the values of $\delta$ and Z are simply set to zero, and the hardware of the APU can be simplified by eliminating the logic gates and circuits that depend on $\delta$ and Z, keeping instead only the hardware that depends on X and Y.

The preferred embodiment described in the present invention is an APU, that is, an integrated circuit. However, the computational method of the present invention, as well as all of the alternate embodiments, can be easily emulated by a software program. This is particularly true for a software program running on any computing device which supports IEEE floating-point arithmetic.

There are other variations of this invention which will become obvious to those skilled in the art. It will be understood that this disclosure, in many respects, is only illustrative. Although the various aspects of the present invention have been described with respect to various preferred embodiments thereof, it will be understood that the invention is entitled to protection within the full scope of the appended claims.

What is claimed is:

1. A computer executable method of processing a representation of a modal interval spherical projection comprising the steps of:
   a. providing an azimuthal projection unit for receiving a representation of a vector comprised of modal intervals X, Y, and Z, each modal interval of said modal intervals delimited by first and second marks of a digital scale;
   b. using said azimuthal projection unit to receive said representation of a vector comprised of modal intervals X, Y, and Z, each modal interval of said modal intervals delimited by first and second marks of a digital scale;
   c. using said azimuthal projection unit to partition an analytical expression of an azimuthal spherical projection into a pair of independent functions, a function of said pair of independent functions exhibiting a monotonicity over piecewise domains of said function; and,
   d. using said azimuthal projection unit to perform a modal interval analysis upon said function of said pair of independent functions wherein arguments of said piecewise domains are modal intervals, said modal interval analysis upon said function being predicated upon creation of a bit mask characterized by bit patterns of each first and second marks of each modal interval of said modal intervals X, Y, Z.

2. A computer executable method of processing a representation of a modal interval spherical projection comprising the steps of:
   a. providing an azimuthal projection unit for receiving a representation of a vector comprised of modal intervals X, Y, and Z, each modal interval of said modal intervals delimited by first and second marks of a digital scale;
   b. using said azimuthal projection unit to receive said representation of a vector comprised of modal intervals X, Y, and Z, each modal interval of said modal intervals delimited by first and second marks of a digital scale;
   c. using said azimuthal projection unit to partition an analytical expression of an azimuthal spherical projection into a pair of independent functions, a function of said pair of independent functions exhibiting a monotonicity over piecewise domains of said function; and,
   d. using said azimuthal projection unit to perform a modal interval analysis upon said function of said pair of independent functions wherein arguments of said piecewise domains are modal intervals, a modal interval spherical projection operation being executed upon detection of an absence of an indefinite operand or a circumstance wherein Z is not greater than or equal to zero.

3. A computer executable method of processing a representation of a modal interval spherical projection comprising the steps of:
   a. providing an azimuthal projection unit for receiving a representation of modal intervals X, Y, and Z, each modal interval of said modal intervals delimited by first and second marks of a digital scale, each mark of said first and second marks comprising a bit-pattern;
   b. using said azimuthal projection unit to receive said representation of a vector comprised of modal intervals X, Y, and Z, each modal interval of said modal intervals delimited by first and second marks of a digital scale, each mark of said first and second marks comprising a bit-pattern;
   c. using said azimuthal projection unit to examine the bit-pattern of said each mark of said first and second marks of said each modal interval in furtherance of creating a bit-mask;
   d. using said azimuthal projection unit to create a bit-mask wherein a sign bit of a mark of said each mark of said first and second marks of the X and Y modal intervals is represented, representations of the signs of the sign bits being in consecutive and ordered arrangements within said bit mask; and,
   e. using said azimuthal projection unit to reference, a select consecutive and ordered arrangement of said consecutive and ordered arrangements, a select modal interval result comprising a first result mark and second result mark associated with a modal interval spherical projection operation.

4. A system for computing narrow bounds on a modal interval spherical projection, said system comprising:
   a. an azimuthal projection unit for processing a representation of a modal interval spherical projection in furtherance of producing a modal interval result, said modal interval spherical projection comprising an input vector characterized by modal intervals X, Y, and Z; and,
   b. a floating point processor for processing said modal interval result in furtherance of obtaining correctly rounded endpoints thereof, said modal interval result comprising an output vector characterized by modal intervals X", Y", and Z", said modal interval result being obtained via creation of a bit mask of bit-pattern characterized by each endpoint of paired endpoints of each modal interval of said modal intervals X, Y, Z.

5. A system for computing narrow bounds on a modal interval spherical projection, said system comprising:
   a. an azimuthal projection unit for processing a representation of a modal interval spherical projection in furtherance of producing a modal interval result, said modal interval spherical projection comprising an input vector characterized by modal intervals X, Y, and Z; and;
   b. a floating point processor for processing said modal interval result in furtherance of obtaining correctly rounded endpoints thereof, a modal interval spherical projection operation being executed upon detection of an absence of an indefinite operand or a circumstance wherein Z is not greater than or equal to zero.

6. A system for computing narrow bounds on a modal interval spherical projection, said system comprising:
   a. an azimuthal projection unit for performing an azimuthal spherical projection on a representation of an input vector comprised of modal intervals X, Y, Z so as to return a result vector comprised of modal interval results X", Y", and Z", each modal interval of said modal intervals X, Y, Z being delimited by first and second marks of a digital scale, each mark of said marks characterized by a bit pattern, said azimuthal projection unit examines bit-patterns of said bit-patterns of the marks of each modal interval of said modal intervals X, Y, and Z in furtherance of constructing a bit-mask; and,
   b. a floating point processor for operating upon said result vector in furtherance of returning correctly rounded end points of said modal interval results X", Y" and Z".

7. A computer executable method of processing a representation of a modal interval spherical projection comprising the steps of:
   a. providing an azimuthal projection unit for receiving a representation of modal intervals X, Y, and Z, each modal interval of said modal intervals delimited by first and second marks of a digital scale;
   b. using said azimuthal projection unit to receive said representation of a vector comprised of modal intervals X, Y, and Z, each modal interval of said modal intervals delimited by first and second marks of a digital scale;

c. using said azimuthal projection unit to partition an analytical expression of the spherical projection into independent functions, a first function of said independent functions exhibiting a monotonicity over select piecewise domains of said first function;
d. using said azimuthal projection unit to examine each mark of said first and second marks of said each modal interval and thereafter characterizing said each mark;
e. using said azimuthal projection unit to correlate a first select modal interval result to a first select piecewise domain of said piecewise domains of said first function, said first select modal interval result comprising a first result mark and second result mark; and,
f. using said azimuthal projection unit to execute a first modal interval spherical projection operation upon said first select piecewise domain of said piecewise domains of said first function in furtherance of computing said first select modal interval result, said execution of said first modal interval spherical projection operation being predicated upon said correlating of said first select modal interval result.

8. The method of claim 7 wherein said correlating of said first select modal interval result is predicated upon creation of a bit mask characterized by bit patterns of said first and second marks of said each modal interval of said modal intervals X, Y, and Z.

9. The method of claim 8 wherein for select bit patterns of said bit mask, an ordered arrangement of bits of bit patterns of said select bit patterns delimits a binary representation of indicia characterizing said first modal interval spherical projection operation.

10. The method of claim 7 wherein the modal intervals X and Y, as well as said characterization thereof, are exchanged.

11. The method of claim 10 wherein a second select modal interval result is correlated to a second select piecewise domain of said piecewise domains of said first function, said second select modal interval result comprising a third result mark and fourth result mark.

12. The method of claim 11 wherein a second modal interval spherical projection operation upon said second select piecewise domain of said piecewise domains of said first function is executed in furtherance of computing said second select modal interval result.

13. The method of claim 11 wherein said correlating of said second select modal interval result is predicated upon creation of a bit mask characterized by bit patterns of said first and second marks of said each modal interval of said modal intervals X, Y, and Z.

14. The method of claim 13 wherein for select bit patterns of said bit mask, an ordered arrangement of bits of bit patterns of said select bit patterns delimits a binary representation of indicia characterizing said second modal interval spherical projection operation.

15. The method of claim 13 wherein said bit mask is obtained by exchanging bits from a prior bit mask used for said correlating of said first select modal interval result.

16. A computer executable method of processing a representation of a modal interval spherical projection comprising the steps of:
a. providing an azimuthal projection unit for receiving a representation of modal intervals X, Y, and Z, each modal interval of said modal intervals delimited by first and second marks of a digital scale;
b. using said azimuthal projection unit to receive said representation of a vector comprised of modal intervals X, Y, and Z, each modal interval of said modal intervals delimited by first and second marks of a digital scale;
c. using said azimuthal projection unit to partition an analytical expression of the spherical projection into independent functions, a first function of said independent functions exhibiting a monotonicity over select piecewise domains of said first function;
d. using said azimuthal projection unit to examine each mark of said first and second marks of said each modal interval and thereafter characterizing said each mark;
e. using said azimuthal projection unit to correlate a first select modal interval result to a first select piecewise domain of said piecewise domains of said first function, said first select modal interval result comprising a first result mark and second result mark;
f. exchanging modal intervals X and Y; and,
g. using said azimuthal projection unit to correlate, with said exchanged X and Y modal intervals, a second select modal interval result to a second select piecewise domain of said piecewise domains of said first function, said second select modal interval result comprising a third result mark and fourth result mark.

17. A system for computing narrow bounds on a modal interval spherical projection, said system comprising:
a. a spherical projection unit for performing a spherical projection on a representation of an input vector comprised of modal intervals X, Y, and Z so as to return an output vector comprised of modal intervals X'', Y'', and Z'', each modal interval of said input vector and of said output vector comprised of a first and second mark of a digital scale, each said first and second mark comprised of a bit-pattern, said spherical projection unit examines bit-patterns of said bit-patterns of said each first and second mark of said modal intervals X, Y, and Z in furtherance of constructing a bit mask; and,
b. a floating-point processor for operating upon said modal intervals in furtherance of returning correctly-rounded endpoints of said modal intervals X'', Y'', and Z''.

18. The system of claim 17 wherein said spherical projection unit receives a scalar input variable δ in furtherance of characterizing said spherical projection.

19. The system of claim 17 wherein for select bit patterns of said bit mask, an ordered arrangement of bits of bit patterns of said select bit patterns delimits a binary representation of indicia characterizing a modal interval spherical projection operation.

20. The system of claim 19 wherein for each index of said indicia a modal interval result comprising a first and second mark of a digital scale is defined.

21. The system of claim 19 wherein for each index of said indicia a select piecewise domain of a scalar function f(x, y, z) is defined, said select piecewise domain of said scalar function exhibiting a monotonicity.

22. The system of claim 21 wherein scalar arguments x, y, and z of said scalar function are each marks of a digital scale representing aliases of select endpoints of said modal intervals X, Y, and Z.

23. The system of claim 21 wherein said scalar function f(x, y, z) is an independent function of a partitioned analytical expression of the spherical projection.

24. The system of claim 23 wherein $$f(x, y, z) = \frac{x}{\sqrt{x^2 + y^2 + z^2} + \delta \cdot z},$$

wherein δ is a scalar input variable further characterizing the spherical projection.

25. The system of claim 22 wherein said modal interval result X" comprises F(X, Y, Z), wherein F(X, Y, Z) computes narrow bounds on said select piecewise domain of f(x, y, z) by choosing said aliases of said select endpoints from said modal intervals X, Y, and Z in accordance with said index of said indicia characterizing said modal interval spherical projection operation.

26. The system of claim 22 wherein select bits of said bit mask are exchanged so as to delimit a modified mask in furtherance of computing said modal interval result Y".

27. The system of claim 26 wherein said modal interval result Y" comprises F(Y, X, Z), wherein F(Y, X, Z) computes, with said modified mask, narrow bounds on said select piecewise domain of f(y, x, z) by choosing said aliases of said select endpoints from said modal intervals X, Y, and Z in accordance with said index of said indicia characterizing said modal interval spherical projection operation.

28. The system of claim 17 wherein a bit of said bit mask represents a presence/absence of an exceptional condition, said exceptional condition defined as: the presence of an indefinite operand, or a condition that Z is not greater than or equal to zero.

29. The system of claim 28 whereupon detection of the presence of an exceptional condition occurs, an indefinite modal interval result is returned in said output vector.

30. The system of claim 28 wherein a "sticky bit" is set in furtherance of alerting a user to the presence of the exceptional condition or of allowing the spherical projection unit to avoid further unnecessary computations.

31. A computer executable method of processing a representation of a modal interval spherical projection comprising the steps of:
   a. providing an azimuthal projection unit for receiving a representation of modal interval operands, each modal interval operand of said modal interval operands delimited by first and second marks of a digital scale;
   b. using said azimuthal projection unit to receive said representation of a vector comprised of modal intervals X, Y, and Z, each modal interval of said modal intervals delimited by first and second marks of a digital scale; and,
   c. providing a first function of independent functions of a partitioned analytical expression of a spherical projection, said first function exhibiting a monotonicity over select piecewise domains of said first function, arithmetic operations being assigned to piecewise domains of said select piecewise domains of said first function in furtherance of computing narrow bounds on/for said each piecewise domain of piecewise domains of said select piecewise domains of said first function using said azimuthal projection unit via selection of optimal endpoints from said modal interval operands.

32. The method of claim 31 further comprising the step of characterizing all marks of said first and second marks of said each modal interval operand in furtherance of creating a mask for a mask driven modal interval spherical projection assessment of said first function.

33. The method of claim 32 further comprising the step of performing a select arithmetic operation of said arithmetic operations assigned to piecewise domains of said select piecewise domains of said first function based upon the created mask.

34. A computer executable method for computing narrow bounds on a modal interval spherical projection comprising the steps of:
   a. selectively assessing formulae in furtherance of evaluating a first function of independent functions of a partitioned analytical expression of a spherical projection, said first function of said independent functions exhibiting a monotonicity over select piecewise domains of said first function, said select piecewise domains comprising arguments characterized by a representation of an input vector comprising modal intervals, each modal interval of said modal intervals delimited by first and second marks of a digital scale;
   b. examining each mark of said first and second marks of said each modal interval and thereafter characterizing said each mark;
   c. correlating a first select modal interval result for each assessment of formula of said formulae associating a first select piecewise domain of said piecewise domains of said first function to said characterization of said each mark, said first select modal interval result comprising a first result mark and second result mark;
   d. providing a spherical projection unit for performing a spherical projection operation upon said first select piecewise domain of said piecewise domains of said first function in furtherance of computing narrow bounds on a modal interval spherical projection; and,
   e. using said spherical projection unit to execute a first modal interval spherical projection operation upon said first select piecewise domain of said piecewise domains of said first function in furtherance of computing narrow bounds on a modal interval spherical projection.

* * * * *